(12) United States Patent
Zhu

(10) Patent No.: US 7,392,512 B2
(45) Date of Patent: Jun. 24, 2008

(54) SYSTEM AND METHOD FOR AUTOMATIC CONVERSION FROM WAP CLIENT PROVISIONING XML REPRESENTED OBJECTS TO OMA DM TREE STRUCTURE REPRESENTED OBJECTS

(75) Inventor: Yuhang Zhu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 724 days.

(21) Appl. No.: 10/856,432

(22) Filed: May 27, 2004

(65) Prior Publication Data

US 2005/0055453 A1    Mar. 10, 2005

Related U.S. Application Data

(60) Provisional application No. 60/501,047, filed on Sep. 8, 2003.

(51) Int. Cl.
*G06F 9/45* (2006.01)
*G06F 9/44* (2006.01)

(52) U.S. Cl. ......................... 717/144; 717/157; 709/202

(58) Field of Classification Search ................. 717/136, 717/140, 144–148, 157–158; 709/202–203, 709/227
See application file for complete search history.

(56) References Cited

U.S. PATENT DOCUMENTS

| | | | | |
|---|---|---|---|---|
| 5,978,587 | A * | 11/1999 | Baisley et al. | 717/144 |
| 6,513,059 | B1 * | 1/2003 | Gupta et al. | 709/202 |
| 6,912,538 | B2 * | 6/2005 | Stapel et al. | 707/101 |
| 6,931,635 | B2 * | 8/2005 | Inagaki et al. | 717/157 |
| 7,028,306 | B2 * | 4/2006 | Boloker et al. | 719/310 |
| 7,051,070 | B2 * | 5/2006 | Tuttle et al. | 709/203 |
| 7,055,818 | B2 * | 6/2006 | Furusawa | 271/220 |
| 7,072,984 | B1 * | 7/2006 | Polonsky et al. | 709/246 |
| 7,165,239 | B2 * | 1/2007 | Hejlsberg et al. | 717/114 |
| 7,181,438 | B1 * | 2/2007 | Szabo | 707/2 |
| 7,188,183 | B1 * | 3/2007 | Paul et al. | 709/229 |
| 7,216,179 | B2 * | 5/2007 | Ott et al. | 709/238 |
| 7,219,338 | B2 * | 5/2007 | Venter | 717/140 |
| 7,225,426 | B2 * | 5/2007 | Frank et al. | 717/108 |
| 7,228,530 | B2 * | 6/2007 | Imai | 717/144 |
| 7,277,917 | B2 * | 10/2007 | Tuttle et al. | 709/203 |
| 7,281,241 | B2 * | 10/2007 | Benoudiz et al. | 717/132 |
| 2003/0103484 | A1 | 6/2003 | Oommen et al. | 370/338 |

FOREIGN PATENT DOCUMENTS

EP    1 315 330 A1    5/2003

OTHER PUBLICATIONS

Wong et al, "Efficient management of XML contents over wireless environment by Xtream", ACM SAC, pp. 1122-1127, 2004.*

(Continued)

*Primary Examiner*—Anil Khatri
(74) *Attorney, Agent, or Firm*—Merchant & Gould P.C.

(57) ABSTRACT

A method and system automatically converts a Wireless Internet Protocol (WAP) Client Provisioning (CP) objects to Open Mobile Alliance (OMA) Device Management (DM) objects. WAP CP is enabled according to XML (eXtensible Markup Language) and defines a standard way to bootstrap mobile device's connectivity settings and application protocol access parameters using XML. OMA DM is also enabled according to XML and provides similar functionality, but is organized according to a mandated tree structure. The present invention automatically converts vendor specific parameters from WAP CP to OMA DM such that the vendor specific parameters are more easily managed by an OMA DM server and client.

24 Claims, 6 Drawing Sheets

OTHER PUBLICATIONS

Hanslo et al, "The efficiency of XML as an intermediate data representation for wireless middleware communication", ACM SAICSIT pp. 279-283, 2004.*

Steele et al, "XML based mobile agent", IEEE ITCC, vol. 2, pp. 42-48, 2005.*

Biancheri et al, "EIHA ?¦? deploying web and WAP services using XML technology", ACM SIGMOD vol. 30, No. 1, pp. 5-12, 2001.*

Uribarren et al, "Middleware for distributed services and mobile applications", ACM InterSense, pp. 1-7, 2005.*

Chen et al, "Mobile EE An enterprise mobile service platform", ACM pp. 283-297, 2003.*

"*Provisioning Content Version 1.1*"; Open Mobile Alliance; Version Nov. 12, 2002; pp. 1-77; http://www.openmobilealliance.org.

" *JDOM* "; pp. 200-231.

"*Document Object Model Core*"; Nov. 13, 2000; pp. 1-44.

"*SyncML Device Management Tree and Description*, Version 1.1.2, Approved version Dec. 2, 2003, Open Mobile Alliance OMA-SyncML-DMTND-V1_1_2-20031202-A, Continues the Technical Activities Originated in the SyncML Initiative"; 2003-2004 Open Mobile Alliance Ltd.; pp. 1-44.

"*SyncML Device Management Standardized Objects*, Version 1.1.2, Approved version Dec. 3, 2003, Open Mobile Alliance OMA-SyncML-DMStdObj-V1_1_2-20031203-A, Continues the Technical Activities Originated in the SyncML Initiative"; 2003-2004 Open Mobile Alliance Ltd.; pp. 1-42.

"*SyncML Device Management Security*, Version 1.1.2, Approved version Dec. 9, 2003, Open Mobile Alliance OMA-SyncML-DMSecurity-V1_1_2-20031209-A, Continues the Technical Activities Originated in the SyncML Initiative"; 2003-2004 Open Mobile Alliance Ltd.; pp. 1-15.

"*SyncML Representation Protocol Device Management Usage*, Approved Version 1.1.2—Jun. 13, 2003, Open Mobile Alliance OMA-SyncML-DMRepPro-V1_1_2-20030613-A, Continues the Technical Activities Originated in the SyncML Initiative"; 2003-2004 Open Mobile Alliance Ltd.; pp. 1-37.

"*SyncML Device Management Protocol*, Version 1.1.2, Approved Version Dec. 12, 2003, Open Mobile Alliance OMA-SyncML-DMProtocol-V1_1_2-20031203-A, Continues the Technical Activities Originated in the SyncML Initiative"; 2003-2004 Open Mobile Alliance Ltd.; pp. 1-41.

"*Notification Initiated Session*, Version 1.1.2, Approved Version Dec. 5, 2003, Open Mobile Alliance OMA-SyncML-DMNotification-V1_1_2-20031205-A, Continues the Technical Activities Originated in the SyncML Initiative"; 2003-2004 Open Mobile Alliance Ltd.; pp. 1-15.

"*SyncML Device Management Bootstrap*, version 1.1.2, Approved Version Dec. 9, 2003, Open Mobile Alliance OMA-SyncML-DM-Bootstrap-V1_1_2-20031209-A, Continues the Technical Activities Originated in the SyncML Initiative"; 2003-2004 Open Mobile Alliance Ltd.; pp. 1-24.

"*Device Management Conformance Requirements*, Approved Version 1.1.2—Jun. 13, 2003, Open Mobile Alliance OMA-SyncML-DMConReqs-V1_1_2-20030613-A, Continues the Technical Activities Originated in the SyncML Initiative"; 2003-2004 Open Mobile Alliance Ltd.; pp. 1-19.

"*Enabler Release Definition for OMA Device Management (based on SyncML DM)*, Version 1.1.2, Approved Version Dec. 9, 2003, Open Mobile Alliance OMA-ERELD-SyncML_DM-V1_1_2-20031209-A, Continues the Technical Activities Originated in the SyncML Initiative"; 2003-2004 Open Mobile Alliance Ltd.; pp. 1-13.

* cited by examiner

```
                            WAP CP XML

410
<wap-provisioningdoc>        420
    <characteristic type="TAPI">
    430  <parm name="CellBroadcastLanguage" value="0"/>
    typ. <parm name="CellBroadcastEnableTopicList" value="1"/>
         <parm name="CellBroadcastEnabled" value="1"/>
         <parm name="Voicemail1" value="+14257059982"/>
         <parm name="Voicemail2" value="+14257059982"/>
         <parm name="SMSC" value="+14254448627"/>
         <parm name="CountryCode" value="1"/>
    440  <parm name="AreaCode" value="425"/>
         <characteristic type="Busy">         450
             <characteristic type="Voice">
             460  <parm name="TAPI_FORWARD_ADDRESS" value=""/>
             typ. <parm name="TAPI_FORWARD_TIMEOUT" value=""/>
                  <parm name="TAPI_FORWARD_ENABLED" value=""/>
             </characteristic>
         </characteristic>
    </characteristic>
</wap-provisioningdoc>
```

*Fig. 4*

SYSTEM AND METHOD FOR AUTOMATIC CONVERSION FROM WAP CLIENT PROVISIONING XML REPRESENTED OBJECTS TO OMA DM TREE STRUCTURE REPRESENTED OBJECTS

CROSS REFERENCE(S) TO RELATED APPLICATION(S)

This application is a utility patent application that claims the benefit under 35 U.S.C. § 119(e) of U.S. Provisional Patent Application No. 60/501,047 filed on Sep. 8, 2003.

BACKGROUND OF THE INVENTION

Device management is a technology that provides customization, servicing, and personalization of mobile devices such as pen and keyboard-based handheld computers, wireless phones, pen tablets, notebooks, laptops, sensory devices, intelligent devices, embedded devices, and vehicle systems, not excluding any other mobile device. Device management also involves provisioning a mobile device, or providing the parameters to the mobile device to allow the functions of the mobile device to operate. Provisioning mobile devices can be difficult and time consuming. As the capability of mobile devices continues to increase, the number of parameters needed to be provisioned also increases.

Previously, the provisioning of a mobile device was standardized according to the Wireless Application Protocol (WAP) developed by the WAP Forum as the de facto standard protocol. WAP may be described as a visual interactive computer telephone voice response system. More recently, the standardization for provisioning has been transitioned to the Open Mobile Alliance (OMA) and their Device Management (DM) protocol. However, the structure and operation of OMA DM is different than the structure and operation of WAP.

SUMMARY OF THE INVENTION

The present invention is directed towards providing a system and method for automatically converting WAP objects within the WAP structure to OMA DM objects within the OMA DM structure.

WAP may be described as a visual interactive computer telephone voice response system. WAP supports most wireless networks and WAP is supported by most operating systems. WAP Client Provisioning (WAP CP) defines a standard way to bootstrap mobile device's connectivity settings and application protocol access parameters using XML. These managed parameters may be extended to a broader range according to vendor specific applications while complying to the WAP CP XML DTD (Document Type Definition).

In contrast, the Open Mobile Alliance (OMA) Device Management (DM) Group defines WAP CP as bootstrap mobile device mechanism and OMA DM Protocol as continuous provisioning mechanism which uses a different XML DTD. Accordingly, the OMA DM structure is also enabled via XML, however the OMA DM is mandated to be organized in a tree structure with internal nodes and leaf nodes.

The present invention therefore defines an automatic algorithm to convert WAP CP XML represented vendor specific parameters to the nodes under OMA DM. By such a conversion, the bootstrapped WAP CP vendor specific parameters are more easily managed by an OMA DM server and client.

BRIEF DESCRIPTION OF THE DRAWINGS

FIG. 4 illustrates an exemplary section of WAP CP XML that is provided for vendor specific parameters;

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
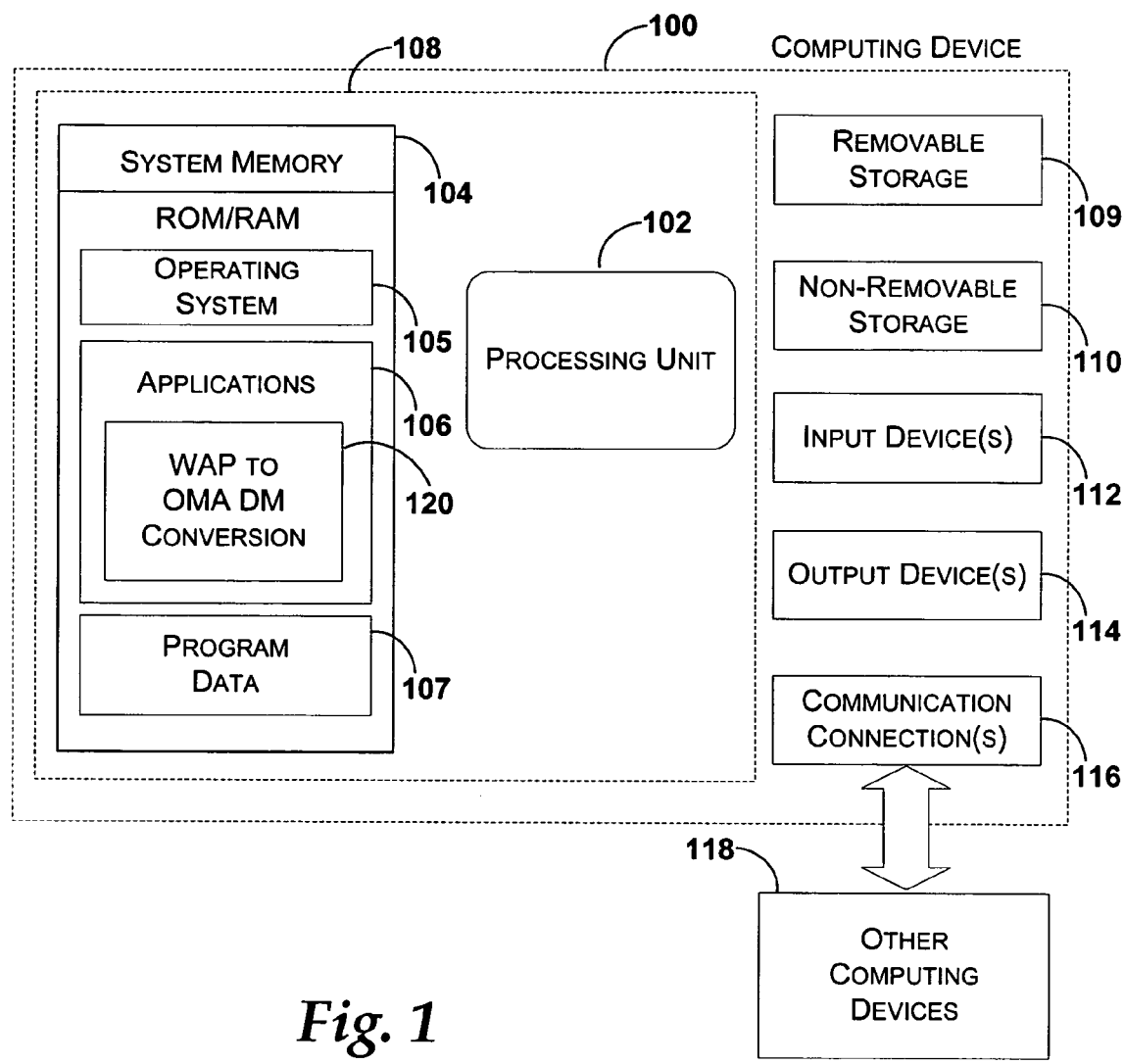
FIGS. 1 and 2 illustrate exemplary computing devices that may be used according to exemplary embodiments of the present invention.

With reference to FIG. 1, one exemplary system for implementing the invention includes a computing device, such as computing device 100. Computing device may be configured as a client, a server, mobile device, or any other computing device that provides client provisioning according to Open Mobile Alliance (OMA) guidelines. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a WAP to OMA DM conversion application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
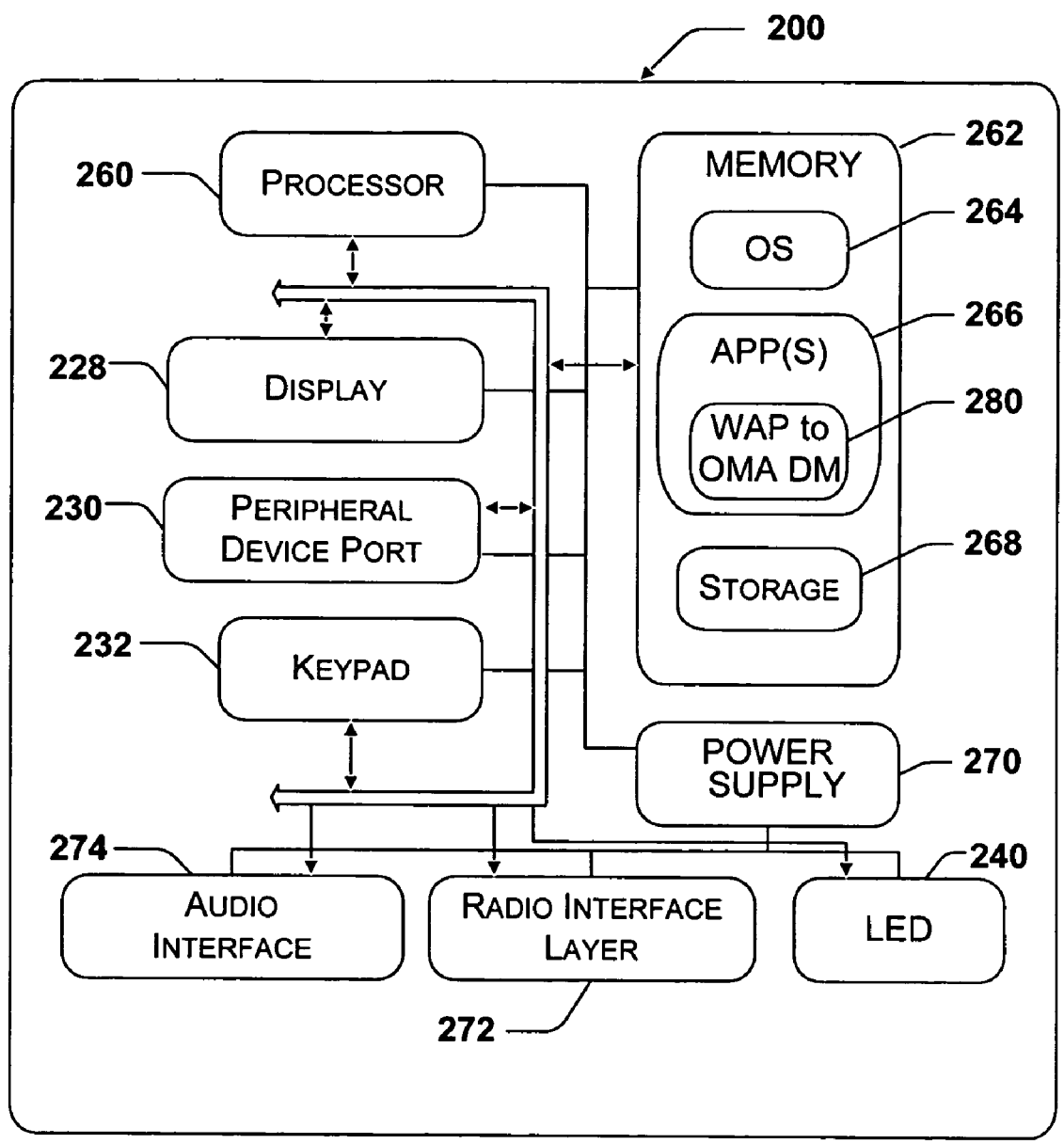

FIG. 2 shows an alternative operating environment for a mobile device substantially for use in the present invention. In one embodiment of the present invention, mobile device 200 is integrated as a computing device, such as an integrated personal digital assistant (PDA) and wireless phone.

In this embodiment, mobile device 200 has a processor 260, a memory 262, a display 228, and a keypad 232. Memory 262 generally includes both volatile memory (e.g., RAM) and non-volatile memory (e.g., ROM, Flash Memory, or the like). Mobile device 200 includes an operating system 264, which is resident in memory 262 and executes on processor 260. Keypad 232 may be a push button numeric dialing pad (such as on a typical telephone), a multi-key keyboard (such as a conventional keyboard), or may not be included in the mobile device in deference to a touch screen or stylus. Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. In one embodiment, application programs 266 include a WAP to OMA DM conversion application 280. Mobile device 200 also includes non-volatile storage 268 within the memory 262. Non-volatile storage 268 may be used to store persistent information which should not be lost if mobile device 200 is powered down. The applications 266 may use and store information in storage 268, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 268 synchronized with corresponding information stored at the host computer.

Mobile device 200 has a power supply 270, which may be implemented as one or more batteries. Power supply 270 might further include an external power source, such as an AC adapter or a powered docking cradle that supplements or recharges the batteries.

Mobile device 200 is also shown with two types of external notification mechanisms: an LED 240 and an audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile device 200 also includes a radio 272 that performs the function of transmitting and receiving radio frequency communications. Radio 272 facilitates wireless connectivity between the mobile device 200 and the outside world, via a communications carrier or service provider. Transmissions to and from the radio 272 are conducted under control of the operating system 264. In other words, communications received by the radio 272 may be disseminated to application programs 266 via the operating system 264, and vice versa.

The radio 272 allows the mobile device 200 to communicate with other computing devices, such as over a network. The radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

WAP to OMA DM Conversion Algorithm

The present invention is generally directed to converting WAP (Wireless Application Protocol) CP (Client Provisioning) XML (eXtensible Markup Language) objects to OMA (Open Mobile Alliance) DM (Device Management) objects. As used herein, "objects" refers to parameters, tags, elements, attributes, content, internal nodes, leaf nodes, and other structures associated with both XML and the tree structure associated with OMA DM.

Figure 3:
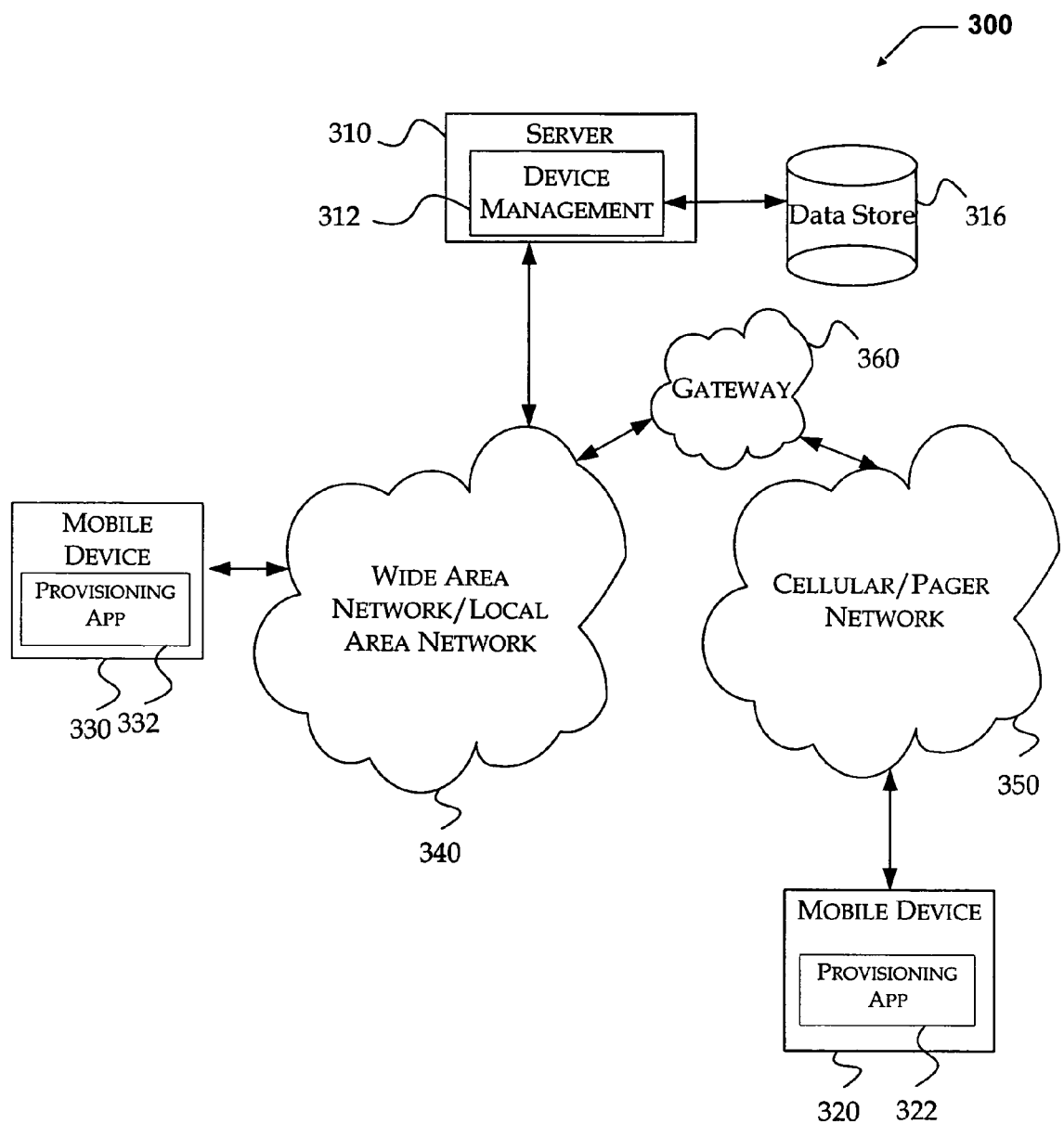
FIG. 3 is a functional block diagram generally illustrating a mobile device management provisioning system.

FIG. 3 is a functional block diagram generally illustrating a mobile device management system 300, in accordance with aspects of the invention. Server 310, mobile computing device 330, and mobile computing device 320 are computing devices such as the ones described above in conjunction with FIG. 1 and FIG. 2. Server 310 is configured to run device management application 312. Device management application 312 provides data and operations relating to configuration settings and parameters for mobile devices, such as the connectivity settings and application parameters associated with mobile computing device 320 and mobile computing device 330. Data store 316 is configured to store the configuration parameters and settings. The parameters and settings may be transmitted over a wide area network (WAN)/local area network (LAN) 340 or a cellular pager/network to the mobile computing devices. One example of a WAN is the Internet that connects millions of computers over a host of gateways, routers, switches, hubs, and the like. An example of a LAN is a network used to connect computers in a single office. A WAN may connect multiple LANs. Networks 340 and 350 may also be directly linked.

Initially, upon boot-up, mobile devices 320 and 330 do not include the parameters or settings required to contact services or content through various protocols, such as the WAP protocol. These non-bootstrapped mobile devices are not by themselves able to contact any kind of data service or contact through WAP. These mobile devices need to be loaded, or bootstrapped, with the connectivity information and settings. A provisioning application, such as 322 or 332, residing on mobile device 320 or mobile device 330, is configured to interact with device management application 312 on server 310 to manage the provisioning of the parameters and settings associated with the mobile device. The functionality that is initially provisioned to the mobile device could include network transport connectivity information, settings to change the default security model, application related settings, and other device settings.

Upon boot-up, server 310 bootstraps the mobile devices with provisioning information that defines connectivity parameters and settings associated with the mobile device. Applications 322 and 332 and device management application 312 may then communicate using any one of several client-server protocols.

Cellular/pager network 350 is a network responsible for delivering messages to and receiving messages from wireless devices. Cellular/pager network 350 may include both wireless and wired components. For example, cellular/pager network may include a cellular tower that is linked to a wired telephone network. Typically, the cellular tower carries communication to and from mobile devices, such as cell phones, notebooks, pocket PCs, long-distance communication links, and the like. Server 310 may also locally connect with mobile devices via wired or wireless transport.

Gateway 360 routes messages between cellular/pager network 350 and WAN/LAN 340. For example, server 310 may send data addressed to mobile computing device 320 through gateway 360. Gateway 360 provides a means for transporting the message from the WAN/LAN 340 to cellular/pager network 350. Conversely, a user with a device connected to a cellular network may be accessing the Web. Gateway 360 allows hyperlink text protocol (HTTP) messages to be transferred between WAN/LAN 340 and cellular/pager network 350. More gateways may be used within the system (not shown).

FIG. 4 illustrates an exemplary section of WAP CP XML that is provided for vendor specific parameters in accordance with the present invention. WAP CP XML section 500 includes tags, elements, attributes and content.

The term "element" refers to the basic unit of an XML document. The element may contain attributes, other elements, content, and other building blocks for an XML document.

The term "tag" refers to a command inserted in a document that delineates elements within an XML document. Each element can have no more than two tags: the start tag and the end tag. It is possible to have an empty element (with no content) in which case one tag is allowed.

The content between the tags is considered the element's "children" (or descendants). Hence, other elements embedded in the element's content are called "child elements" or "child nodes" of the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that is not included in the element's content.

In this example, WAP CP XML section 500 includes WAP provisioning element as indicated by tag 410. A parent characteristic element is included in the WAP provisioning element of type "TAPI" as indicated by tag 420. TAPI is short for Telephony Application Programming Interface, which is an API for connecting a computing device to telephone services. The standard supports connections by individual computing devices as well as LAN connections serving many devices. Within each connection type, TAPI defines standards for simple call control and for manipulating call content.

The TAPI element includes a number of parameters (parm elements) within its content for controlling telephony aspects of a computing device. For example, parameter 430 is a parameter for enabling broadcast across a cellular network and its value is shown as set to "1".

A child element is included in the TAPI element of type "Busy" as indicated by tag 440. Another child element is included in the Busy element of type "Voice" as indicated by tag 450. The voice element includes a number of other parameters (e.g., 460) related to the voice aspects of the computing device. The WAP CP XML for these vendor specific parameters is therefore somewhat hierarchical with child elements included within other elements along with various parameters for controlling the telephony (in this example) of the computing device. Other embodiments may include other vendor specific parameters and settings than the telephony parameters shown.

Figure 5:
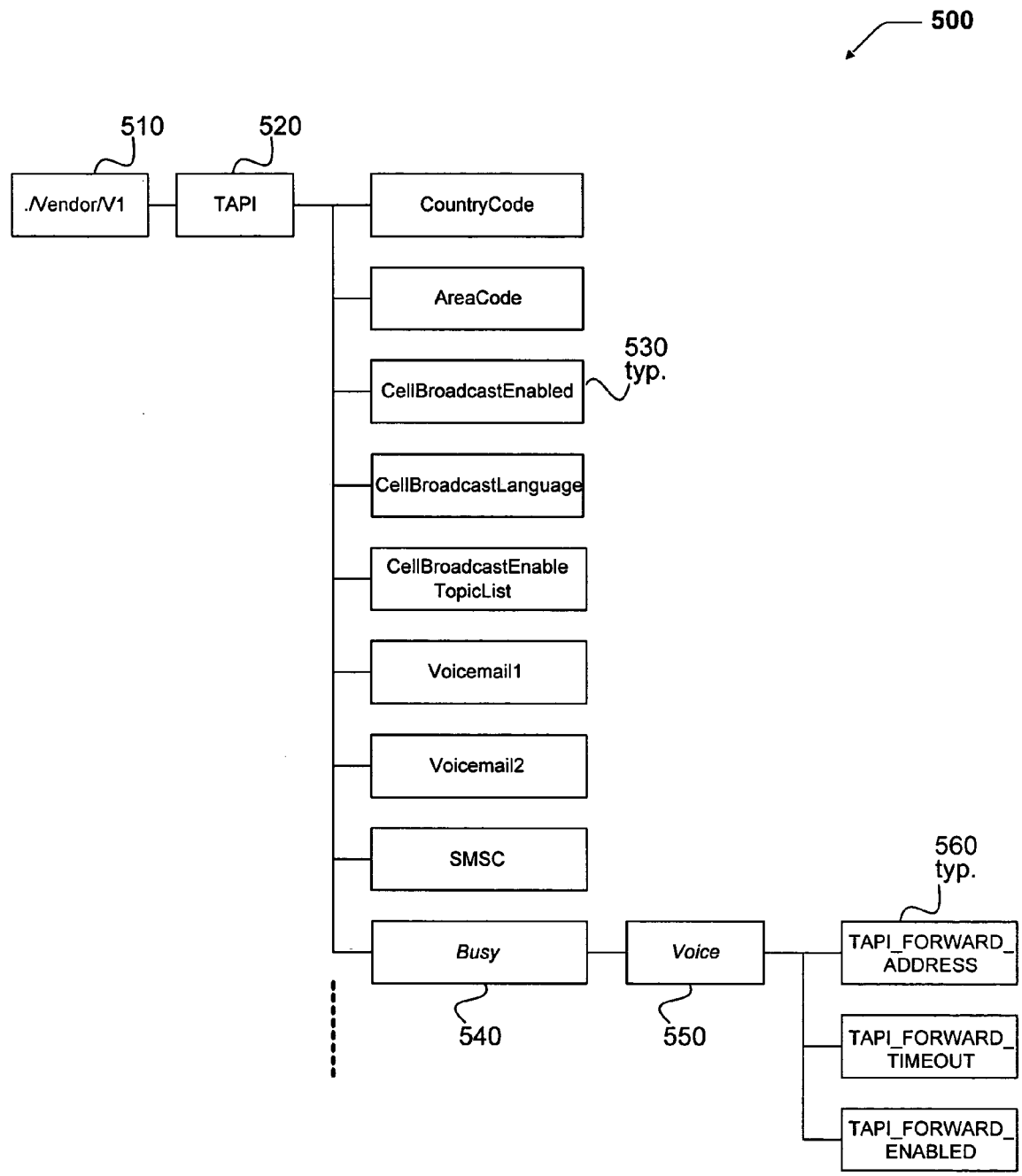
FIG. 5 illustrates an exemplary OMA DM tree structure corresponding to the WAP CP XML of FIG. 4.

FIG. 5 illustrates an exemplary OMA DM tree structure corresponding to the WAP CP XML of FIG. 4 in accordance with the present invention. OMA DM tree 500 includes objects and nodes that correspond to the tags and elements converted from the WAP CP XML shown in FIG. 4. Similar to FIG. 4, other embodiments may include other vendor specific parameters and settings than the telephony parameters shown.

OMA DM tree 500 forms from internal parent node 510 that illustrates that the following nodes correspond to vendor specific parameters and settings. Internal parent node 520 indicates that the nodes following internal node 520 are related to TAPI or telephony parameters of a computing device (similar to the TAPI element of FIG. 4). As illustrated, TAPI 520 includes leaf nodes (e.g., leaf node 530) for the various parameters associated with the telephony aspects of a computing device. These leaf nodes are generated from converting the parm elements included in the TAPI tag of FIG. 4 to an OMA DM tree structure.

TAPI 520 may also include other internal nodes, such as internal node 540. Internal node 540 corresponds to the busy element in FIG. 4 (child element of the TAPI element). Additionally, an internal node 550 is also generated that corresponds to the voice element of FIG. 4 (child element of the busy element). Voice 550 includes leaf nodes (e.g., 560) that are associated with the voice aspects of a computing device. The example in FIG. 5 illustrates the result of a conversion by the algorithm of the present invention from WAP CP XML to OMA DM. The conversion process is described more fully below with respect to FIG. 6.

Figure 6:
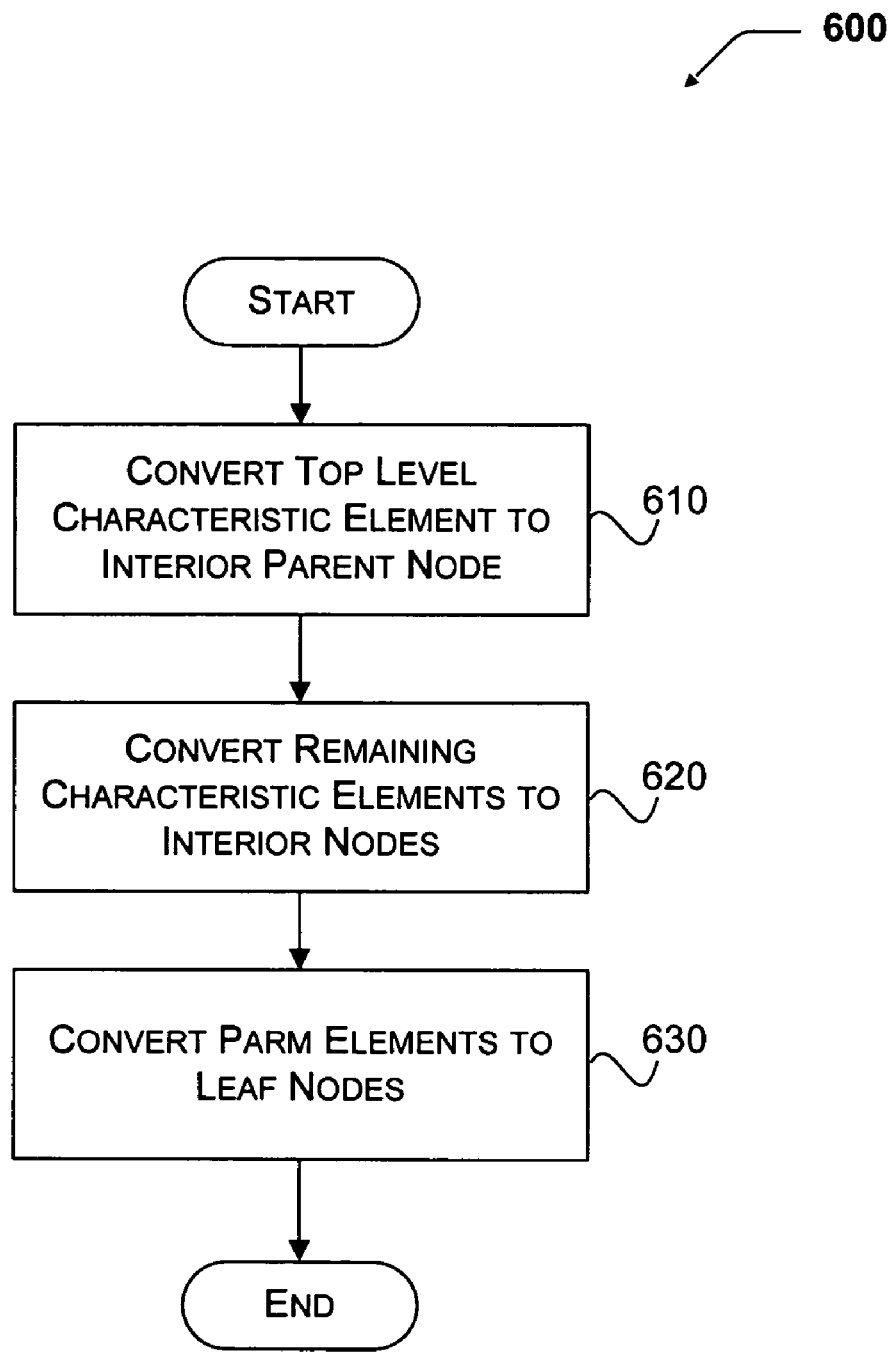
FIG. 6 illustrates an operational flow diagram of an exemplary process for converting WAP CP XML objects to OMA DM tree structure objects, in accordance with aspects of the present invention.

FIG. 6 illustrates an operational flow diagram of an exemplary process for converting WAP CP XML objects to OMA DM tree structure objects in accordance with the present invention. Process 600 begins at a start block where a section or sections of WAP CP XML is available for conversion to an OMA DM tree structure. Processing continues at block 610.

At block 610, the top level characteristic element (e.g., 420 of FIG. 4) in the WAP CP XML is converted to an interior parent node (e.g., 520 of FIG. 5) under the OMA DM tree structure. The interior parent node may be under any reasonable predefined OMA DM tree interior node. For example, the interior parent node may be placed under a node (e.g., 510 of FIG. 5) that indicates the vendor corresponding to the parameters following the interior parent node. Once the top level characteristic element is converted to an interior parent node, processing continues at block 620.

At block 620, the remaining characteristic elements (e.g., 440 of FIG. 4) in the WAP CP XML are converted to an interior nodes (e.g., 540 of FIG. 5) under the OMA DM tree structure. In one embodiment, the hierarchy of the interior nodes under the OMA DM structure are kept the same as the hierarchy of the characteristic elements in the WAP CP XML. Processing continues at block 630.

At block 630, the parm elements (e.g., 430 in FIG. 4) in the WAP CP XML are converted to leaf nodes (e.g., 530 of FIG. 5) under the OMA DM tree structure. In one embodiment, the name assigned to each leaf node corresponds to the name attribute of its corresponding parm element. For example, the name of a leaf node is "Voicemail1" when the name attribute of the corresponding parm element is "Voicemail1". In a further embodiment, the value of the leaf node corresponds to the value attribute of the parm element. For example, the value of the leaf node is "+14257059982" when the value of the corresponding parm element equals "+14257059982". In one embodiment, all the parm elements under a specific characteristic element in the WAP CP XML are converted as the children of the corresponding interior node under OMA DM that corresponds to the characteristic element. For example, in FIG. 4, a parm element with a name attribute of "CountryCode" is a child of the TAPI characteristic element. Correspondingly, in FIG. 5, a leaf node named "CountryCode" is also the child of the TAPI interior node. Once the parm elements are converted to leaf nodes, processing advances to an end block where process 600 ends.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for converting WAP (wireless application protocol) CP (client provisioning) XML (extensible markup language) to an OMA (open mobile alliance) DM (device management) tree structure, comprising:
    converting an element of the WAP CP XML into an internal node within the OMA DM tree structure when the element corresponds to a characteristic element within the WAP CP XML; wherein the element is associated with provisioning parameters of a mobile device that allow the mobile deice to communicate over a network;
    converting the element into a leaf node within the OMA DM tree structure when the element corresponds to a parm element within the WAP CP XML; and
    storing the converted elements on a computer storage device such that provisioning using the OMA DM is enabled.

2. The computer-implemented method of claim 1, wherein converting the element into the internal node further comprises converting the element into an internal parent node when the element corresponds to a top most characteristic element within the WAP CP XML.

3. The computer-implemented method of claim 1, wherein the internal node is a child node when the element is a child element.

4. The computer-implemented method of claim 1, wherein the leaf node is a child node when the element is a child element.

5. The computer-implemented method of claim 1, wherein converting the element into the leaf node further comprises naming the leaf node according to a name attribute associated with the parm element.

6. The computer-implemented method of claim 1, wherein converting the element into the internal node further comprises naming the internal node according to a type attribute associated with the characteristic element.

7. The computer-implemented method of claim 1, wherein the internal node is a child of an internal parent node that indicates that the internal node corresponds to a vendor specific parameter.

8. The computer-implemented method of claim 1, wherein the leaf node is a child of an internal parent node that indicates that the leaf node corresponds to a vendor specific parameter.

9. A system for converting WAP (wireless application protocol) CP (client provisioning) XML (extensible markup language) to an OMA (open mobile alliance) DM (device management) tree structure, comprising:
    a server including a network communication device coupled to a network and a data store configured to store parameters associated with the mobile device; and
    a device management application configured to perform actions, including:
        converting an element of the WAP CP XML into an internal node within the OMA DM tree structure when the element corresponds to a characteristic element within the WAP CP XML; wherein the element is associated with provisioning parameters of a mobile device that allow the mobile device to communicate over a network;
        converting the element into a leaf node within the OMA DM tree structure when the element corresponds to a paim element within the WAP CP XML; and
    storing the converted elements on a computer storage device such that provisioning using the OMA DM is enabled.

10. The system of claim 9, wherein converting the element into the internal node further comprises converting the element into an internal parent node when the element corresponds to a top most characteristic element within the WAP CP XML.

11. The system of claim 9, wherein converting the element into the internal node further comprises naming the internal node according to a type attribute associated with the characteristic element.

12. The system of claim 9, wherein converting the element into the leaf node further comprises naming the leaf node according to a name attribute associated with the parm element.

13. The system of claim 9, wherein the internal node is a child node when the element is a child element.

14. The system of claim 9, wherein the leaf node is a child node when the element is a child element.

15. The system of claim 9, wherein the internal node is a child of an internal parent node that indicates that the internal node corresponds to a vendor specific parameter.

16. The system of claim 9, wherein the leaf node is a child of an internal parent node that indicates that the leaf node corresponds to a vendor specific parameter.

17. A computer storage device having computer executable instructions for converting WAP (wireless application protocol) CP (client provisioning) XML (extensible markup language) to an OMA (open mobile alliance) DM (device management) tree structure, the instructions comprising:

converting a vendor specific element of the WAP CP XML into an internal node within the OMA DM tree structure when the vendor specific element corresponds to a characteristic element within the WAP CP XML; wherein the vendor specific element is associated with provisioning parameters of a mobile device that allow the mobile deice to communicate over a network; and converting the vendor specific element into a leaf node within the OMA DM tree structure when the vendor specific element corresponds to a parm element within the WAP CP XML; and storing the converted elements.

18. The computer storage device medium of claim 17, wherein converting the element into the internal node further comprises converting the element into an internal parent node when the element corresponds to a top most characteristic element within the WAP CP XML.

19. The computer storage device of claim 17, wherein converting the element into the internal node further comprises naming the internal node according to a type attribute associated with the characteristic element.

20. The computer storage device of claim 17, wherein converting the element into the leaf node further comprises naming the leaf node according to a name attribute associated with the parm element.

21. The computer storage device of claim 17, wherein the internal node is a child node when the element is a child element.

22. The computer storage device of claim 17, wherein the leaf node is a child node when the element is a child element.

23. The computer storage device of claim 17, wherein an internal parent node is included in the OMA DM tree structure that indicates the internal node corresponds to a vendor specific element.

24. The computer storage device of claim 17, wherein an internal parent node is included in the OMA DM tree structure that indicates the leaf node corresponds to a vendor specific element.

* * * * *